March 19, 1968    R. A. HERRICK    3,374,457
MISSILE SEPARATION CONNECTOR
Filed April 26, 1966    2 Sheets-Sheet 1
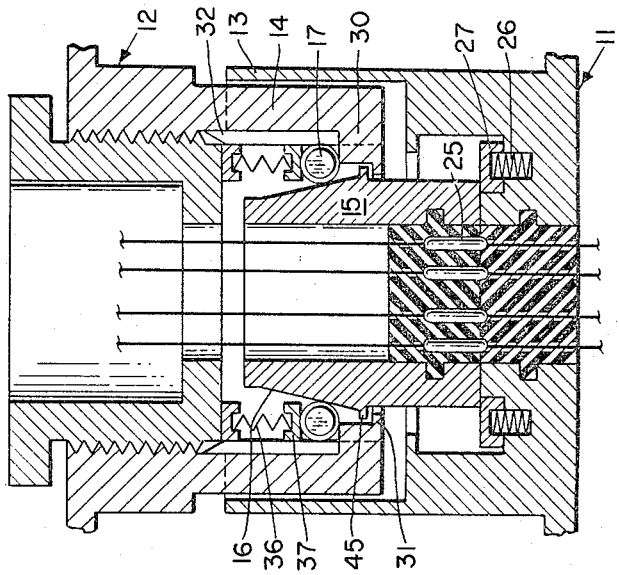
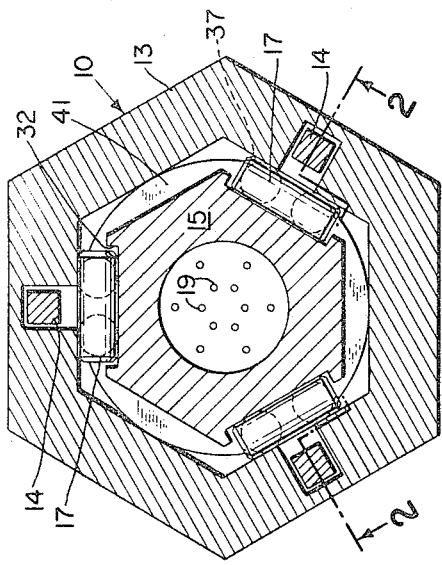
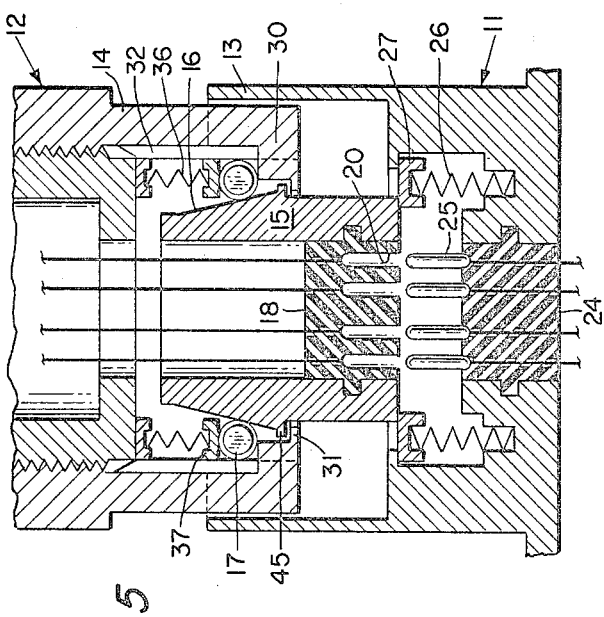
INVENTOR.
ROGER A. HERRICK

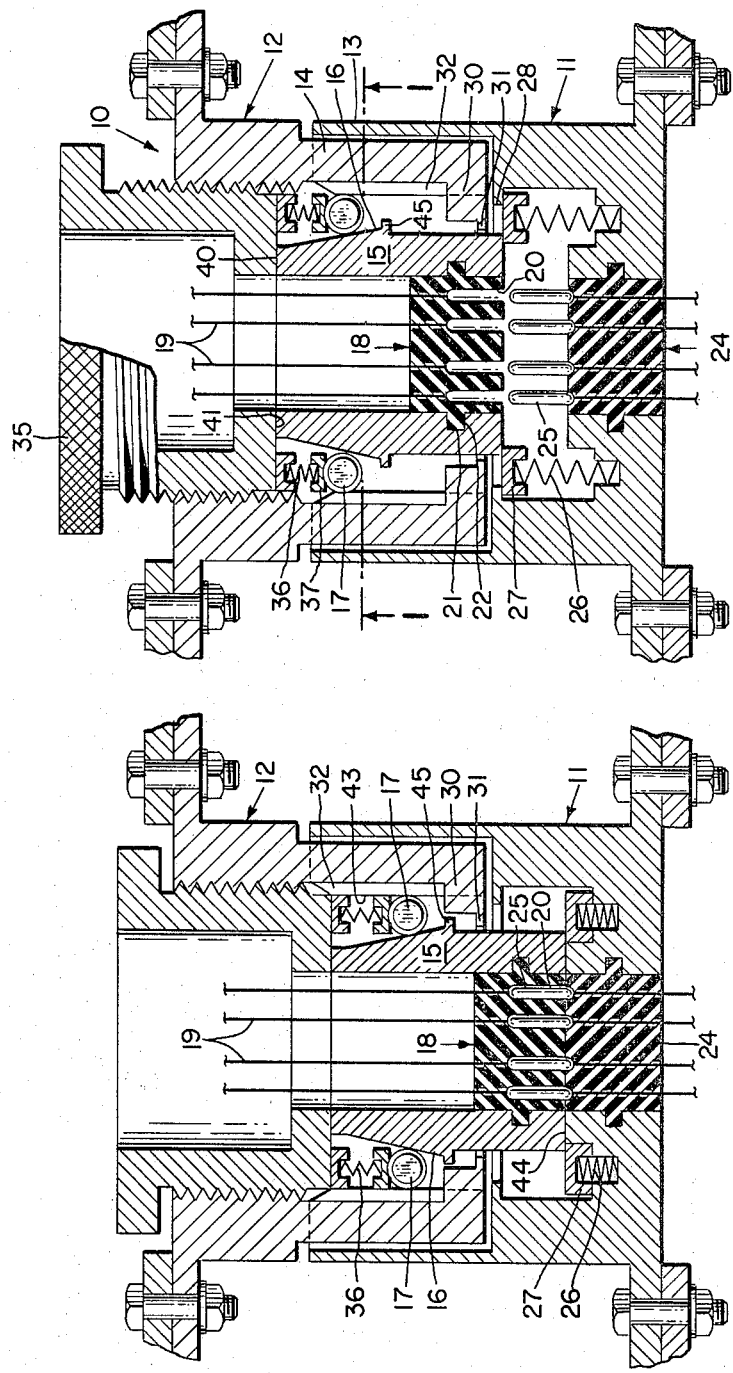

United States Patent Office 3,374,457
Patented Mar. 19, 1968

3,374,457
MISSILE SEPARATION CONNECTOR
Roger A. Herrick, Sunnyvale, Calif., assignor, by mesne assignments, to the United States of America as represented by the Secretary of the Navy
Filed Apr. 26, 1966, Ser. No. 546,155
6 Claims. (Cl. 339—45)

The present invention relates to disconnect couplings and more particularly to a device for separably coupling the electrical circuits of adjacent stages of a rocket or other type of space vehicle.

In the field of space exploration through multistage rockets and other space vehicles one of the problems encountered is that of releasing and separating an aft stage or an expended stage from the adjacent forward stage. Such a release often is initiated during a period when the assembly is coasting awaiting actuation of the next propulsion stage, and must be accomplished with a minimum of disturbance. Where more precise orbital control is required, as in space flights involving rendezvous of separately launched vehicles, the small disturbances acceptable in the pioneering phase of satellite launchings now present undesirable deviations and must be substantially reduced or avoided entirely. In those instances where electrical connections as well as mechanical stage connections are to be separated the area in which undesired forces may occur is enlarged.

Prior devices for effecting the mechanical release of a stage of a rocket or space vehicle have included timing devices, sequence switching and miniature rocket driven rotary releases which, though effective as to separating the main stage, are not adaptable to disconnecting electrical connections between stages. The present invention provides a simple, compact device for effecting electrical disconnect in a rocket or space vehicle without detrimental thrust or drag being imparted to the separating stages.

Accordingly, it is an object of the present invention to provide a novel electrical disconnect method and device for multi-stage rockets, missiles and space vehicles.

It is another object of the present invention to provide an electrical disconnect which is simple in construction and operation and does not produce detrimental thrust or drag force components in separating stages.

A further object of the present invention is to provide a missile stage electrical disconnect in which the pins and sockets do not separate any faster than do the missile stages.

A still further object of this invention is to provide a method of and means for effecting controlled separation of electrical connections between adjacent stages of a rocket, missile or other space vehicle so as to avoid causing tumbling or other detrimental action in the separating sections.

Other objects and many of the attendant advantages of this invention will be readily appreciated as the same becomes better understood by reference to the following detailed description when considered in connection with the accompanying drawings in which like numerals designate like parts throughout and wherein:

FIG. 1 is a transverse sectional view of one embodiment of the invention taken along a line substantially corresponding to line 1—1 of FIG. 2;

FIG. 2 is a longitudinal sectional view taken along a line substantially corresponding to line 2—2 of FIG. 1 showing the operative components partly assembled;

FIG. 3 is a longitudinal sectional view of the components of the embodiment of FIG. 2 in the assembled state;

FIG. 4 is a longitudinal sectional view of the components of the embodiment of FIG. 2 shortly after missile stage separation has commenced; and FIG. 5 is a longitudinal sectional view of the components of the embodiment of FIG. 2 after complete separation of the electrical connections.

In the illustrated embodiment of the invention, the simplified electrical disconnect device 10 as shown in FIG. 1 includes inter-fitting members of the aft stage 11 and the forward stage 12, respectively, of the missile assembly. Shell 13 of stage 11 and fingers 14 of stage 12 encompass a releasable interlock assembly which comprises self-locking aligning means such as an elongated insert 15 having an outer tapering flat surface 16 which preferably is disposed within shell 13 and fingers 14, see FIG. 3, when the device is in operating condition. Insert 15 is centrally positioned by axially movable means such as rollers 17. The self-locking aligning means having positioned therein a plug 18 from which connectors 19 extend to terminals or connection points, not shown, in the forward stage of the composite missile assembly.

In FIG. 2 a view substantially along the line 2—2 in FIG. 1 is presented to more clearly illustrate the invention. At least three axially movable rollers 17, two of which are shown in FIG. 2, are incorporated in this embodiment to provide accurate control of the separating components. Of course, more than three such axially movable means may be used where desired. An interlock assembly is shown having a plug 18 containing sockets 20 with insert 15 engaging the two by such means as annular ridge 21 on the plug being received in annular recess 22 in the insert. Plug 24 carrying terminal connectors 25 is supported on aft missile stage 11 and means for exerting an upward force such as springs 26 bearing upon a spring plate or ring 27 are positioned in stage 11. Inwardly protruding portions such as indicated at 28 are provided in stage 11 to limit the extension of springs 26. Insert 15 may now be positioned within stages 11 and 12 to the point of contact with plate or ring 27. Fingers 14 of forward stage 12 are provided with tangs 30 having tabs 31 extending radially inwardly therefrom both of which will be described in greater detail. Tabs 31 serve to guide insert 15 centrally downward toward the adjacent portions of stage 11 among other functions thereof.

With stages 11 and 12 disposed as shown in FIG. 2 and insert 15 positioned in the manner illustrated, rollers 17 next are positioned along tapering surface 16 in grooves 32 provided therefor. Hollow bolt 35 having means connected thereto for axially displacing rollers 17 such as springs 36 and caps 37 next is assembled and turned into the position in stage 12 (see FIG. 2). In this position, sockets 20 are aligned with and disposed adjacent to terminals 25 and the upper surface 40 of insert 15 abuts against the lower surface 41 of bolt 35. Stages 11 and 12 are mated by turning bolt 35 into section 12 thereby forcing insert 15 downwardly placing springs 26 in compression and inserting terminals 25 into sockets 20. The entire disconnect device is shown in assembled form in FIG. 3 ready for actuation upon movement apart of the respective missile stages.

In the assembled or mated condition shown in FIG. 3, it will be seen that rollers 17 are locked in wedging contact between tapering surface 16 and the inner surface 43 of shell 13 and are urged into contact by the compression of springs 36. Terminals 25 are fully inserted into sockets 20 and the lower surface of insert 15 abuts against surface 44 of stage 11. Tabs 31 extend from tangs 30 to a point radially inward of the outer periphery of tabs 45 which extend radially outward from insert 15. The various components are in readiness for separation upon launching of the composite missile assembly and release of stage 11 from stage 12. The downward force of springs 36 against rollers 17 wedges the rollers in position and prevents pressure of springs 26 from forcing insert 15 upward.

Operation of the disconnect device is most clearly explained in connection with the description of FIGS. 4 and 5. The initial movement in separation involves displacement of tangs 30 upward until the upper surface thereof contacts rollers 17. Further movement upward of stage 12 and tang 30 releases the lock-wedge between rollers 17 and shell 13 permitting corresponding upward movement of insert 15 in response to the pressure of springs 26. Springs 26, of course, exert a sufficient force to both move insert 15 upward and withdraw terminals 25 from sockets 20. The inserts may not be moved upward at a greater rate than that of the separation of the adjacent stages because of the locking action of rollers 17 on surface 16. Tabs 31 will not normally contact tabs 45 during separation hence these tabs serve the primary purpose of ensuring removal of insert 15 in the event a malfunction occurs in the interlock assembly. In FIG. 5 the tabs are shown in the relative positions they assume during separation. FIG. 5 also shows the relative positions of shell 13 and fingers 14 upon complete separation of the electrical connections. Such separation is accomplished without imparting thrust to the separating sections and with an insignificant drag imposed on forward stage 12 in overcoming the force springs 36 exert against rollers 17.

By the method and apparatus of this invention electrical connections between missile stages, such as pins or terminals and sockets, are disconnected without creating unbalancing forces which heretofore have caused the stages to tumble. Such connectors also are disconnected in a manner which prevents imparting undesired thrust to the forward stage thereby providing greater accuracy in the forward stage orbit as well as greater stability of this stage in its orbit.

It will be recognized that many modifications and variations of the present invention are possible in the light of the above teachings. It is therefore to be understood that within the scope of the appended claims the invention may be practiced otherwise than as specifically described.

I claim:

1. A disconnect device for separating missile components in adjacent missile stages without imparting thrust or causing imbalance comprising:

aligning means partially disposed in each of two adjacent stages of a composite missile assembly;

the portion of the aligning means in the forward stage including surfaces tapering inwardly from an intermediate portion of the aligning means into said forward stage;

axially movable means releasably restraining said aligning means in position in relation to the aft stage when said components are connected and during initial movement apart of said adjacent stages;

means connected to said forward stage for axially displacing said movable means in response to further movement apart of the adjacent stages; and means in said aft stage urging said aligning means into said forward stage upon said further movement apart of said adjacent stages whereby said aligning means is urged out of the one stage at a rate controlled by the rate of separation of the stages thereby eliminating thrust during separation of the stages.

2. The device as defined in claim 1 wherein said missile components are mating electric connector members.

3. The device as defined in claim 1 wherein said aligning means are roller members which normally are wedged under selective pressure between conforming surfaces of the aft stage and a tapering surface of the aligning means.

4. The device as defined in claim 3 wherein said axially displacing means are radially inwardly extending tangs of members connected to said forward stage;

the surface of said tangs which contacts said roller members being disposed aft of said roller members so that movement apart of the adjacent stages will break the wedging action between the roller members and the aft stage.

5. The device as defined in claim 4 wherein said roller members are at least three in number; and first compression means disposed between each roller member and an aft surface of said forward stage for maintaining each roller member in wedging relationship between said aligning means and said aft stage.

6. The device as defined in claim 5 wherein the means in said aft stage comprises second compression means disposed between a forward surface of said aft stage and an aft surface of said aligning means for urging said aligning member free of said aft stage upon release of the wedging relationship in response to forward movement of said forward stage.

References Cited

UNITED STATES PATENTS

| | | |
|---|---|---|
| 2,779,283 | 1/1957 | Baughman. |
| 2,959,129 | 11/1960 | Warren. |
| 3,083,274 | 3/1963 | Sparkes. |
| 3,116,895 | 1/1964 | Mitchum. |
| 3,156,512 | 11/1964 | Peterson et al. |
| 3,174,706 | 3/1965 | Wagner. |

MARVIN A. CHAMPION, *Primary Examiner.*

PATRICK A. CLIFFORD, *Assistant Examiner.*